(12) United States Patent
Usgaonkar et al.

(10) Patent No.: US 8,711,684 B1
(45) Date of Patent: Apr. 29, 2014

(54) METHOD AND APPARATUS FOR DETECTING AN INTERMITTENT PATH TO A STORAGE SYSTEM

(75) Inventors: Ameya Prakash Usgaonkar, Pune (IN); Hari Krishna Vemuri, Pune (IN); Siddhartha Nandi, Pune (IN)

(73) Assignee: Symantec Corporation, Mountain View, CA (US)

( * ) Notice: Subject to any disclaimer, the term of this patent is extended or adjusted under 35 U.S.C. 154(b) by 1167 days.

(21) Appl. No.: 11/827,044

(22) Filed: Jul. 9, 2007

(51) Int. Cl.
*H04L 12/26* (2006.01)
*G06F 12/00* (2006.01)
*G06F 11/00* (2006.01)

(52) U.S. Cl.
USPC .......... 370/228; 370/216; 370/248; 711/154; 714/4.2

(58) Field of Classification Search
None
See application file for complete search history.

(56) References Cited

U.S. PATENT DOCUMENTS

| | | | |
|---|---|---|---|
| 6,766,470 B1* | 7/2004 | Shah | 714/9 |
| 2003/0023893 A1* | 1/2003 | Lee et al. | 714/4 |
| 2004/0064459 A1* | 4/2004 | Pooni et al. | 707/100 |
| 2004/0078632 A1* | 4/2004 | Infante et al. | 714/5 |
| 2005/0114741 A1* | 5/2005 | Chen et al. | 714/47 |
| 2007/0168705 A1* | 7/2007 | Dohi | 714/6 |

* cited by examiner

*Primary Examiner* — Kaushikkumar Patel
(74) *Attorney, Agent, or Firm* — Campbell Stephenson LLP

(57) ABSTRACT

A method and apparatus for detecting an intermittent path to a storage system comprising accessing path statistics comprising indicia of path state of a path to a storage system, determining whether the path state has changed during a predefined period and, if the path state has changed at least a predefined number of times during the predefined period, identifying the path as intermittent. Once a path is deemed intermittent, the path is aged until either the path is no longer intermittent or the path is deemed dead.

11 Claims, 5 Drawing Sheets

METHOD AND APPARATUS FOR DETECTING AN INTERMITTENT PATH TO A STORAGE SYSTEM

BACKGROUND OF THE INVENTION

1. Field of the Invention

The present invention generally relates to computer storage system technology. More particularly, the present invention pertains to a method and apparatus for detecting an intermittent path between a host computer and a storage system.

2. Description of the Related Art

In modern computing systems, a host computer (e.g., a server) may be directly connected to a storage system in an arrangement known as Direct Attached Storage (DAS). The storage system may comprise a multitude of redundant storage arrays to promote high availability and robustness. A path is defined as a logical connection from the host computer to the storage system comprising the disk arrays. In other computing environments, the storage systems may be coupled to the host computer through a communications network in an arrangement known as a Storage Area Network (SAN). In such systems, the communications network is known as a SAN fabric that provides a plurality of paths from the host computer to the storage arrays.

In both DAS and SAN configurations, a large number of paths may exist; although, typically, a SAN configuration has substantially more complex interconnection configuration than a DAS. In either configuration there may be complex physical cabling arrangements. A loose connection of a cable connector can result in intermittent connectivity along a path. Each time a connector "breaks" a connection, the host computer is notified of a path failure. Such a path failure causes the host computer to search for a secondary path to the storage system. In a system that uses passive/active storage, upon a path failure, the host computer begins a fail-over process to avoid using the failed path. When the intermittent path again forms a path, the host computer may restore the connection (i.e., fail-back) through the original path. Upon another interruption on the intermittent path, the host computer will fail-over again and so on. Such repeated fail-over and fail-back processes or repeated searching for alternative paths detrimentally impacts the functionality of the host computer and its ability to utilize the storage system in an efficient manner.

Accordingly, there is a need in the art for a method and apparatus for detecting intermittent paths to a storage system such that these paths can be avoided until the path becomes stable.

SUMMARY

Embodiments of the present invention comprise a method and apparatus for detecting an intermittent path to a storage system comprising accessing path statistics comprising indicia of path state of a path to a storage system, determining whether the path state has changed during a predefined period and, if the path state has changed at least a predefined number of times during the predefined period, identifying the path as intermittent. Once a path is deemed intermittent, the path is aged until either the path is no longer intermittent or the path is deemed dead.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
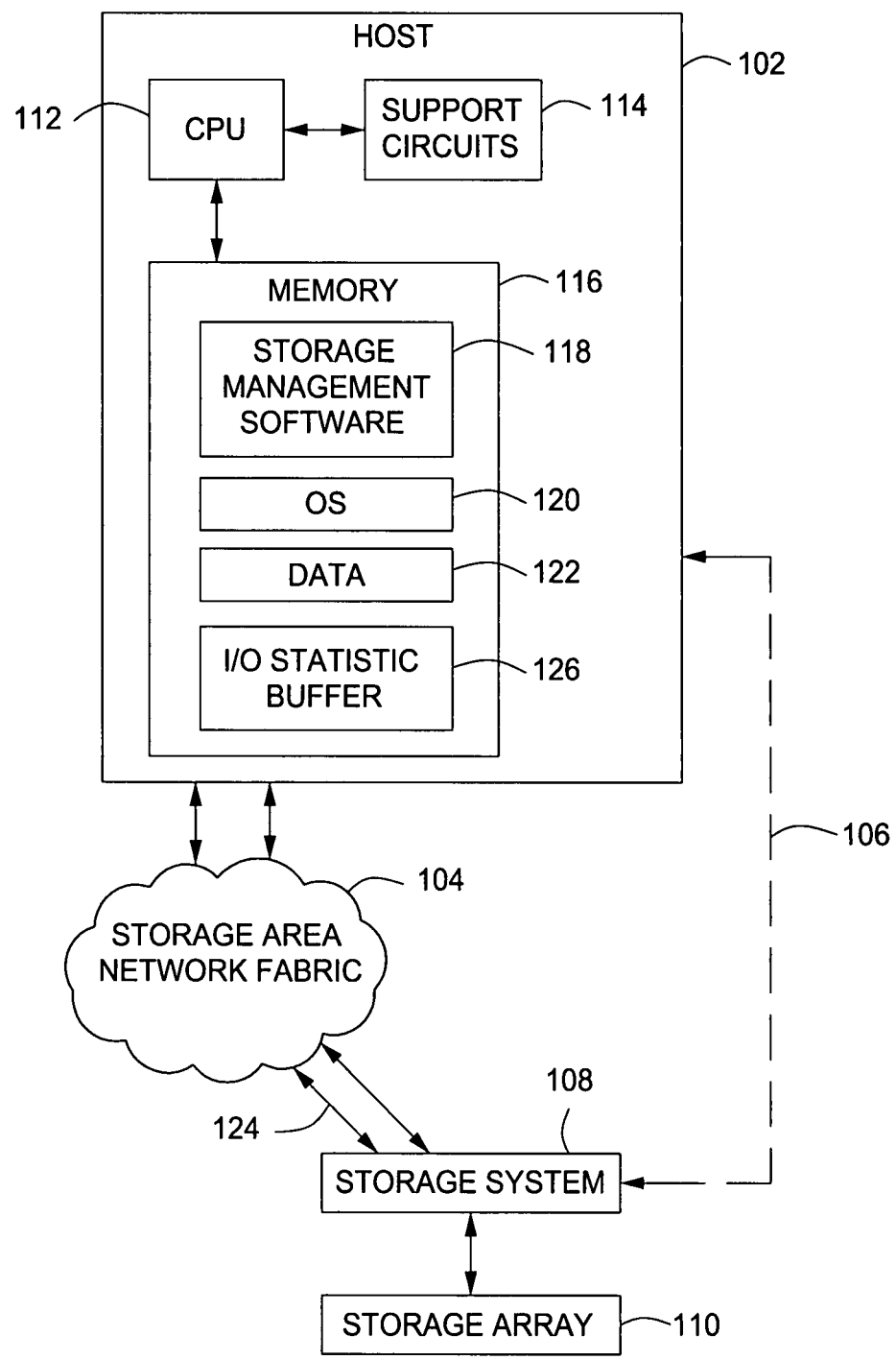
FIG. 1 is a schematic overview of a computing environment having a host computer coupled to a storage system in accordance with at least one embodiment of the present invention.

FIG. 1 is a block diagram of a computing environment 100 employing an apparatus for detecting an intermittent path between a host computer (host 102) and a storage system 108 in accordance with at least one embodiment of the present invention. The environment 100 comprises a host 102, a storage system 108, and storage array 110. In a Direct Attached Storage (DAS) configuration, the host 102 is directly connected to the storage system 108 via a path 106. Path 106 may comprise a plurality of redundant paths. In a Storage Area network (SAN) configuration, the host 102 is coupled to the storage system 108 through a SAN fabric 104, e.g., a data communications network.

The apparatus is usable for practicing a method for detecting and processing I/O failure and, upon restoring a path, detecting an intermittent path, in conformity with the principles of the present invention. Details in connection with the method are disclosed with reference to FIGS. 2-5.

The host 102 is a computing device, such as a server or client that uses the services of the storage system 108. The host 102 comprises, without limitation, a central processing unit (CPU) 112, support circuits 114, and a memory 116. The CPU 112 may be one or more of any commercially available microprocessors or microcontrollers. The support circuits 114 comprise circuits and devices that are used in support of the operation of the CPU 112. The support circuits 114 include, for example, one or more of cache, input/output circuits, system bus, PCI bus, clock circuits, power supplies, or the like. Those skilled in the art will appreciate that the hardware depicted in the FIG. 1 may vary from one computer system to another. For example, various peripheral devices, such as optical disk drives, graphics card, data storage devices, various input/output devices, and the like, may also be used in addition to or in place of the hardware depicted.

The memory 116 may comprise random access memory, read only memory, optical memory, disk drives, removable memory, and the like. Various types of software processes or modules and information are resident within the memory 116. For example, various processes such as an Operating System (OS) kernel 120, data 122, input/output (I/O) error statistics buffer 126 and storage management software 116.

The storage management software 118, when executed by the CPU 112, performs the method of an embodiment of the present invention. The method may be a portion of a large software package that provides multi-pathing for the host computer to facilitate high availability of the storage system 108. For example, the storage management software may be in whole or part of Dynamic Multipathing (DMP) software (such as Volume Manager available from Symantec Corporation). DMP balances input/output (I/O) across all available paths between the host 102 and the storage array 110 to improve performance and availability. The DMP software identifies the particular disks (or storage devices) in the array 110. Once known, the DMP software can dynamically control routing of I/O traffic to the array 110 with high granularity to send traffic to specific disk drives.

In operation, if a path (e.g., path 124) to the storage system fails, the storage management software detects an I/O failure and updates the I/O error statistics buffer 126, processes the failure to determine that a path has failed, then begins a process to re-route I/O requests through alternative paths and/or begin a fail-over process. Upon restoring the path, one embodiment of the invention, tests whether the restored path is intermittent and, if a path is intermittent, the intermittent path is not restored until the path is stable. The process for determining intermittency utilizes the contents of the I/O error buffer 126.

Figure 2:
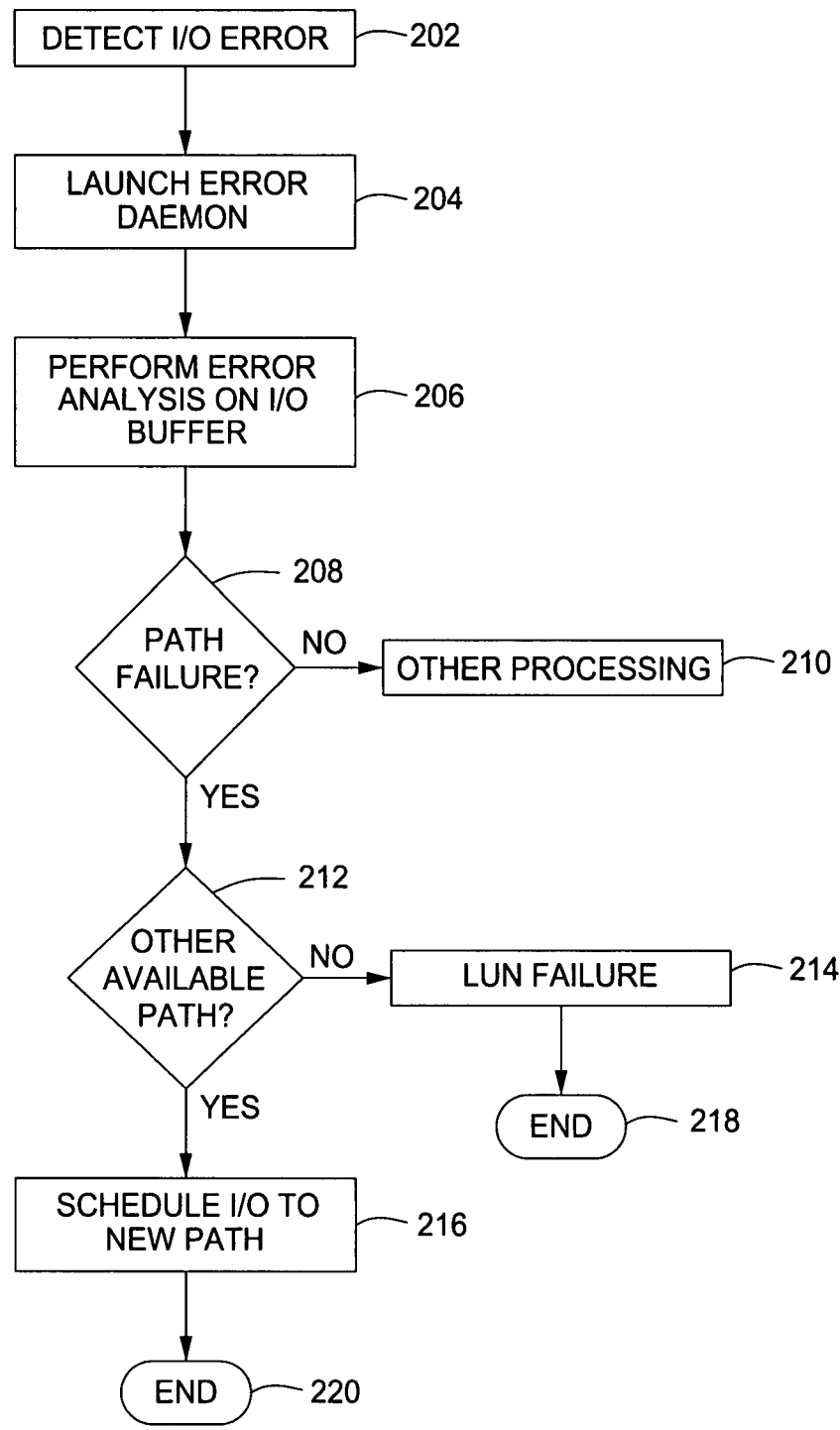
FIG. 2 depicts a flow diagram of a method for detecting an I/O failure within the computing environment of FIG. 1.

FIG. 2 depicts a flow diagram of a method 200 for detecting and processing I/O failures that lead to identification of failed paths. In one embodiment of the invention, the storage management software maintains an error daemon, which is a single kernel thread created at boot time, to process erroneous I/O. The error daemon is normally inactive and sleeping until an I/O error is reported at step 202. When an I/O returns with an error, the erroneous I/O is put into error queue and a signal is sent to error daemon from interrupt context, which, at step 204, launches the error daemon.

When the error daemon wakes up, at step 206, the daemon de-queues and erroneous buffer from the error queue and performs error analysis on the I/O buffer. The error analysis can be specific to the type of storage array if there is a vendor supplied Array Policy Module (APM) available for the array, or the processing can be generic error processing of the storage management software.

The generic error processing involves the following steps until the error queue is empty—
  Determine the sub-path device number on which the error happened.
  Issue SCSI inquiry to the sub-path as IOCTL context and wait for its status.
  Conclude the health of the path, either dead or alive, based on the return status of SCSI inquiry. If SCSI inquiry succeeds, the I/O is retried on the same path until a retry_count is exhausted. If the I/O continues to fail even after exhausting the retry_count, then the method concludes, at step 208, that the failure is due to a media error and fails the I/O such that other processing is required at step 210. The sub-path, however, is not marked bad. On the other hand, if the SCSI inquiry to the sub-path fails, the method 200 concludes, at step 208, the I/O failure to be a path failure and, at step 212, determines whether other paths are available for use. re-schedules the I/O on the other available paths. If there are no available paths to the logical unit number (LUN) of the array, then the method 200 at step 214, marks the LUN as failed (dead) and ends at step 218. Dead LUNs are not probed by restore daemon as discussed with reference to FIG. 3 below. If alternative paths are available, at step 216, the method 200 schedules the I/O to a new path and ends at step 220. The re-scheduling of the I/O might result in a path fail-over for an Active-Passive (NP) array if the failed path was a last primary path.

Apart from error processing, the error daemon is also concerned with updating the statistics for each of the paths involved in I/Os. Although the statistics operation is not frequent, the update process is triggered when a statistics buffer (the I/O error buffer 126 of FIG. 1) reaches 80% occupancy.

Figure 3:
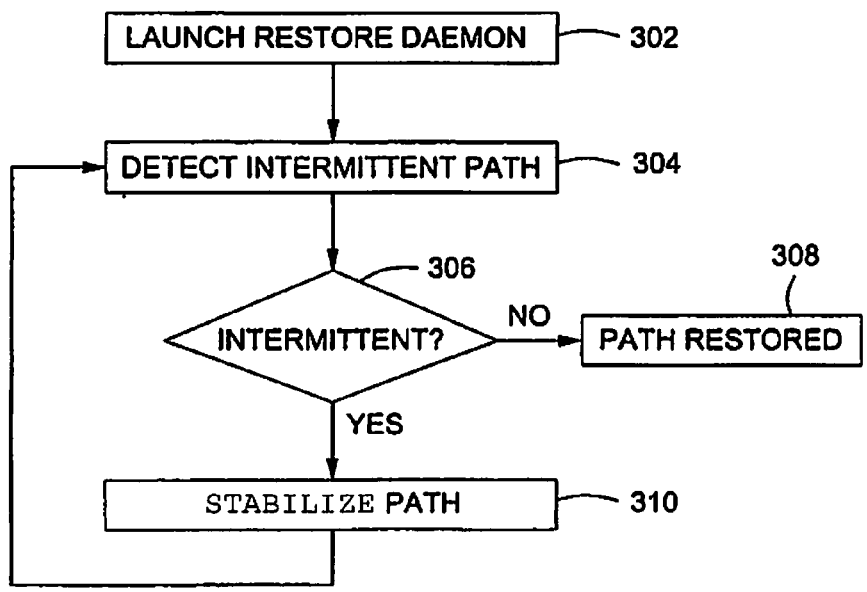
FIG. 3 depicts a high level flow diagram of a method of restoring an intermittent path in accordance with one embodiment of the invention.

FIG. 3 depicts a high level flow diagram of a method 300 for restoring a path, i.e., using a new path that has been scheduled in step 216 of FIG. 2. Once a path has been deemed operational, generally through probing using a SCSI probe as is well known in the art, the path is scheduled for use. However, the path may be intermittent such that the probe may indicate the path is operational, yet in a short time, the path will fail again. Such intermittency may result from loose cables, incorrectly installed connectors, improper wiring, and the like. The method 300 detects such an intermittency and ensures that an intermittent path is not used until the path becomes stable.

The method 300 begins at step 302 with the launch of a restore daemon. Like the error daemon of FIG. 2, the restore daemon is also a kernel thread spawned by storage management software kernel (e.g., a DMP software kernel) at system boot time. Unlike the error daemon, the restore daemon can be terminated and restarted with different parameters at any time by a system administrator. As the name suggests, the restore daemon fundamentally handles automatic restoration of failed paths. The restore daemon is a time-based synchronous thread that is launched (woken up) when a daemon timer is triggered. When the daemon wakes up, it checks the health of the paths depending on the policy specified by the administrator. The administrator specifies the timer and the policy. One such policy is to detect whether a path to be restored is intermittent. If such a policy is implemented, the method 300 proceeds to step 304 to detect the intermittent nature of the path, if any.

At step 304, the method 300 queries whether an intermittency has been detected. If the query is negatively answered, the method 300 deems the path ready for use and proceeds to step 308 to restore the path in a conventional manner. If, on the other hand, the path is found to be intermittent, the method 300 proceeds to step 310 wherein a process is executed to ensure the path is not restored until the path is stable. Step 310 is used to "age" the path to ensure that an intermittent path has ceased being intermittent for a user specified time period prior to being restored. After performing the stabilization step 310, the method 300 returns to the intermittency detection step 304 to ensure the path is no longer intermittent. If so, the path is restored at step 308. However, if the path remains intermittent, the path will be processed again in the stabilization step 310.

Figure 4:
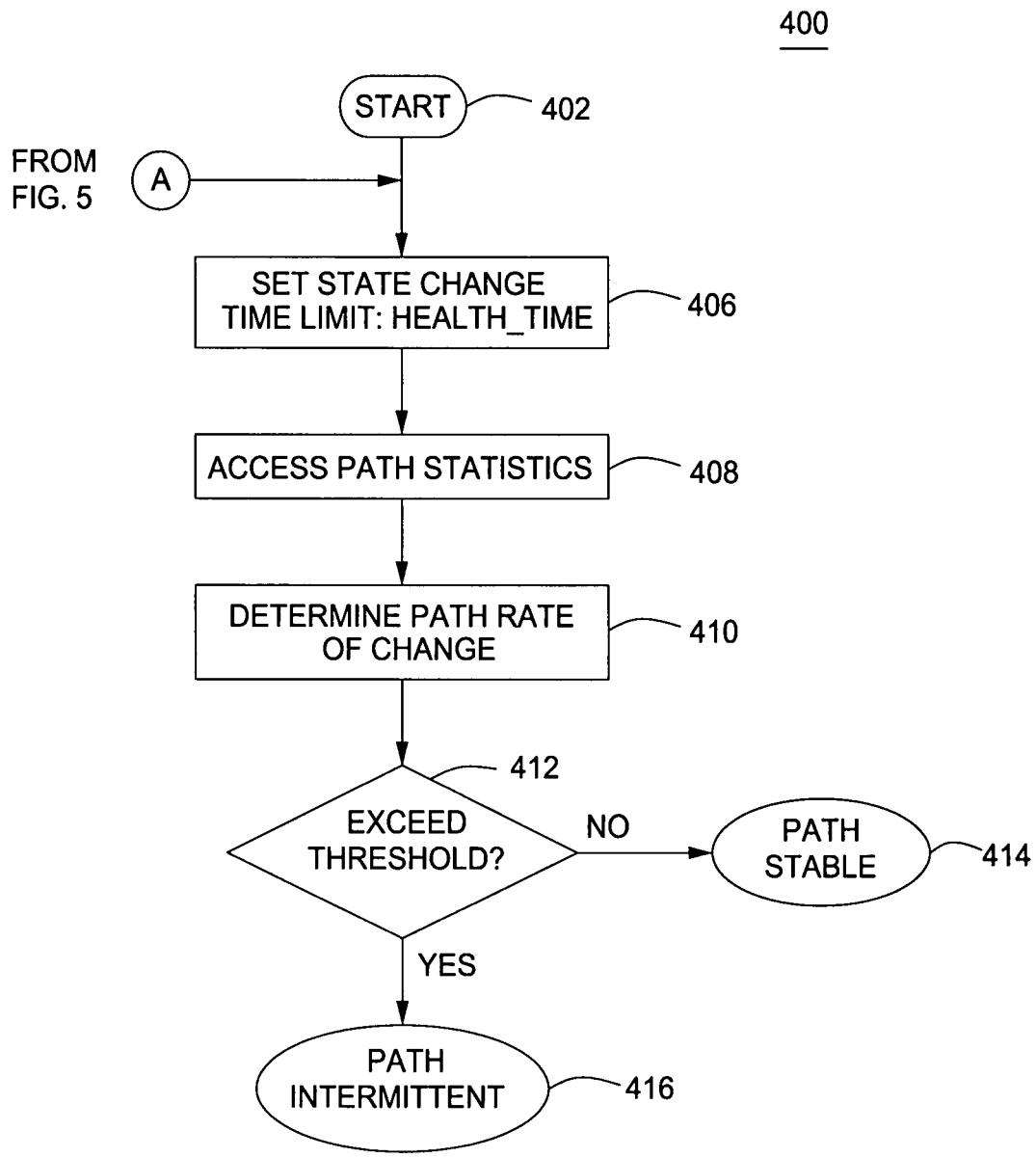
FIG. 4 depicts a flow diagram of a method of detecting an intermittent path in accordance with one embodiment of the invention.

FIG. 4 depicts a flow diagram of a method 400 of detecting an intermittent path in accordance with one embodiment of the invention. The method 400 is a detailed view of the process that occurs during step 304 of FIG. 3.

The method 400 begins at step 402 and proceeds to step 406 wherein a state change time limit (health_time) is set. Generally, the state change time limit is a period of, for example, seconds that is pre-defined by a user or administrator of the host. At step 408, the method 400 accesses the path statistics from the I/O error buffer. These statistics comprise at least one of start and end times of I/O requests, last time of failure of the path, number of failed I/O requests on the failed path, failure counter value, and so on. At step 410, the method 400 determines whether the state of the path has changed during the state change time period. The value associated with the number of state changes during the health_time period is referred to as the state rate of change.

At step 412, the state rate of change is compared to a threshold. If the computed rate exceeds the threshold, the method 400 deems the path to be intermittent. If the rate does not exceed the threshold, then the method 400 deems the path stable. Generally speaking, the method 400 determines whether one or more state changes have occurred during the predefined period. If a path is operating, then failing, then operating again and so on during the period as indicated by, for example, the last time of failure statistic or the failure counter value, the method 400 will deem the path as intermittent, as long as the repeated failures occur at a high enough rate to indicate intermittency.

Figure 5:
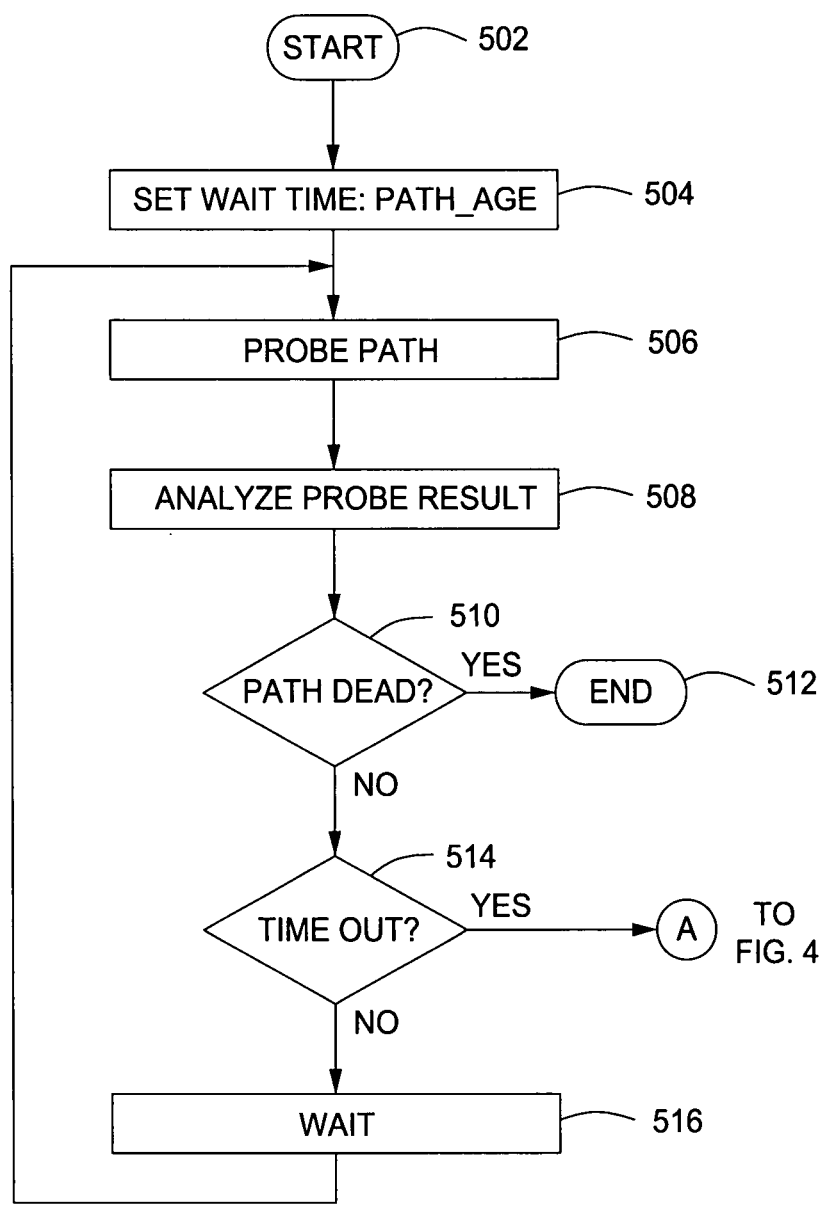
FIG. 5 depicts a flow diagram of a method of determining the stability of an intermittent path in accordance with one embodiment of the invention.

FIG. 5 depicts a flow diagram of a method 500 of stabilizing a path in accordance with one embodiment of the invention. The method 500 is a detailed view of the process that occurs during step 310 of FIG. 3.

The method 5000 begins at step 502 and proceeds to step 504. At step 504, a wait time (path_age) is set. Generally, the wait time is a period of, for example, seconds that is predefined by a user or administrator of the host. The wait time defines the amount of time a path will "age" to ensure that the path is no longer intermittent. During the wait time, at step 506 the path is probed, e.g., repeated probing is periodically performed. If the array is a SCSI array, SCSI probes are sent along the path in a conventional manner. The probe results are analyzed at step 508 to determine the state of the path.

At step 510, the method 510 queries whether the path is dead. If the probe results indicate that the path is never functioning during the wait period, then the path is deemed dead. As a result, the method 500 ends at step 512.

If the path, at times, has probes indicating the path is operational, the method proceeds to step 514. At step 514, the method 500 queries whether the path_age time has timed out. If the path_age period has not timed out, the method 500 waits at step 516 for a predefined period and then returns to step 506 to send a probe. In one embodiment of the invention, path_age period is one minute and the five probes are sent during the minute, i.e., the wait step 516 lasts about 12 seconds.

If the query at step 514 is affirmatively answered, i.e., the path has aged, the method 500 returns to A in method 400 of FIG. 4, wherein the path is tested for intermittency. If the path is no longer intermittent, the decision at step 412 will indicate that the path is stable and can be restored. However, if the path remains intermittent, the method 400 will return to method 500 to further age the path until the path either matures into a stable path or is deemed to be dead.

In this manner, the embodiments of the invention detect an intermittent path and then age the intermittent path until the path is stable. This ensures that an intermittent path is not utilized such that the storage system functionality becomes degraded.

The invention is intended to cover all equivalent embodiments, and is limited only by the appended claims. Various other embodiments are possible within the spirit and scope of the invention. While the invention may be susceptible to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A method for detecting an intermittent path to a storage system comprising:
    accessing path statistics comprising indicia of path state of a path to a storage system wherein the indicia comprise at least one of start and end times for an input/output request, a last time of path failure, a number of failed input/output requests on the path, or a failure counter value;
    detecting whether the path is an intermittent path by
        determining whether the path state has changed during a predefined period by performing an analysis on the path statistics, and
        identifying the path as an intermittent path, in response to the path state having changed at least a predefined number of times during the predefined period;
    aging the path by
        determining whether the path is operational by probing the path periodically, and
        marking the path as recovered, after a threshold number of consecutive probes indicate the path is operational;
    upon the path being marked as recovered, repeating the detecting;
    if the detecting indicates that the path is still intermittent, repeating the aging and the detecting, until the path is no longer intermittent; and
    restoring the path only after the path is determined to be no longer intermittent.

2. The method of claim 1, wherein a path rate of change comprises the number of path state changes occurring during the predefined period.

3. The method of claim 1, wherein the storage system is a Storage Area Network (SAN) and the path is through a SAN fabric.

4. The method of claim 1, wherein the storage system is a Direct Attached System (DAS).

5. The method of claim 1, further comprising aging the path until the path is no longer intermittent or is deemed dead.

6. The method of claim 1, wherein probing the path comprises applying a SCSI probe to the path.

7. An apparatus for detecting whether a path to a storage system is intermittent, the apparatus comprising:
    a host computer;
    the storage system, wherein the storage system is coupled to the host computer by the path, wherein
        the host computer is configured to
            access path statistics within a buffer comprising indicia of path state of the path to the storage system wherein the indicia comprise at least one of start and end times for an input/output request, a last time of path failure, a number of failed input/output requests on the path, or a failure counter value;
            detect whether the path is an intermittent path by
                determining whether the path state has changed during a predefined period by performing an analysis on the path statistics, and
                identifying the path as an intermittent path in response to the path state having changed at least a predefined number of times during the predefined period;
            age the path
                determining whether the path is operational by probing the path periodically, and
                marking the path as recovered, after a threshold number of consecutive probes indicate the path is operational;

upon the path being marked as recovered, repeat the detection of whether the path is an intermittent path;

if the detection indicates that the path is still intermittent, repeat the aging and the detection, until the path is no longer intermittent; and restore the path only after the path is determined to be no longer intermittent.

8. The apparatus of claim 7, wherein a path rate of change comprises the number of path state changes occurring during the predefined period.

9. The apparatus of claim 7, wherein the storage system is a Storage Area Network (SAN) and the path is through a SAN fabric.

10. The apparatus of claim 7, wherein the storage system is a Direct Attached System (DAS).

11. The apparatus of claim 7 wherein the host computer ages the path until the path is no longer intermittent or is deemed dead.

\* \* \* \* \*